May 19, 1942.  G. A. BRUESKE  2,283,533
LIGHT SHUTTER
Filed July 26, 1940  4 Sheets-Sheet 1
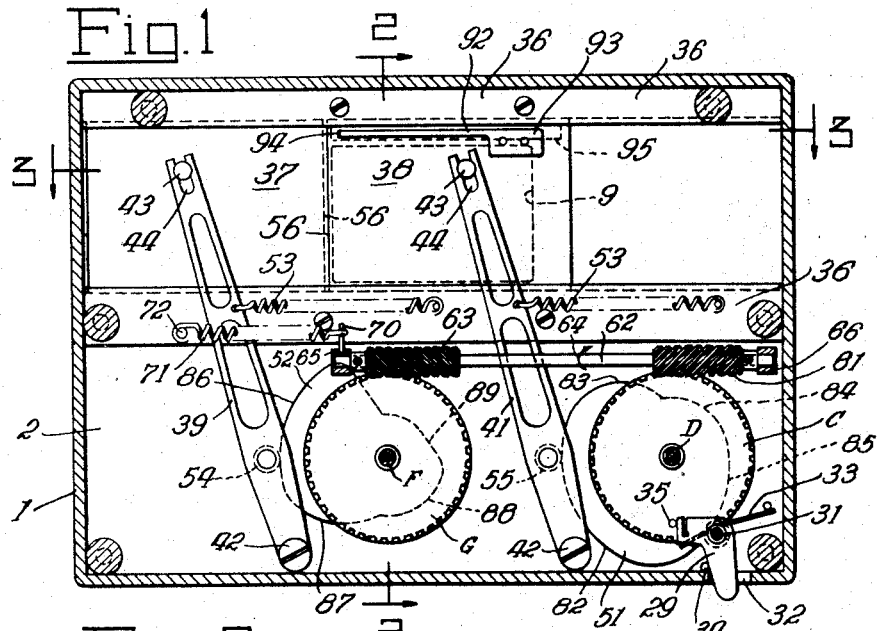
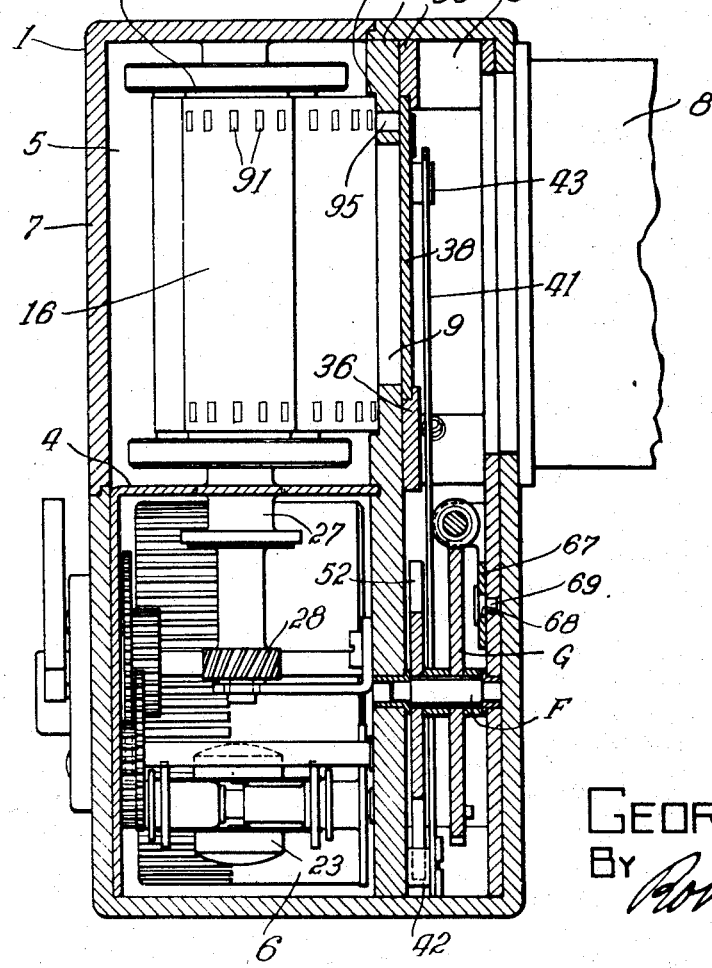
INVENTOR
GEORGE A. BRUESKE
BY Robert F. Miehle, Jr.
ATTY.

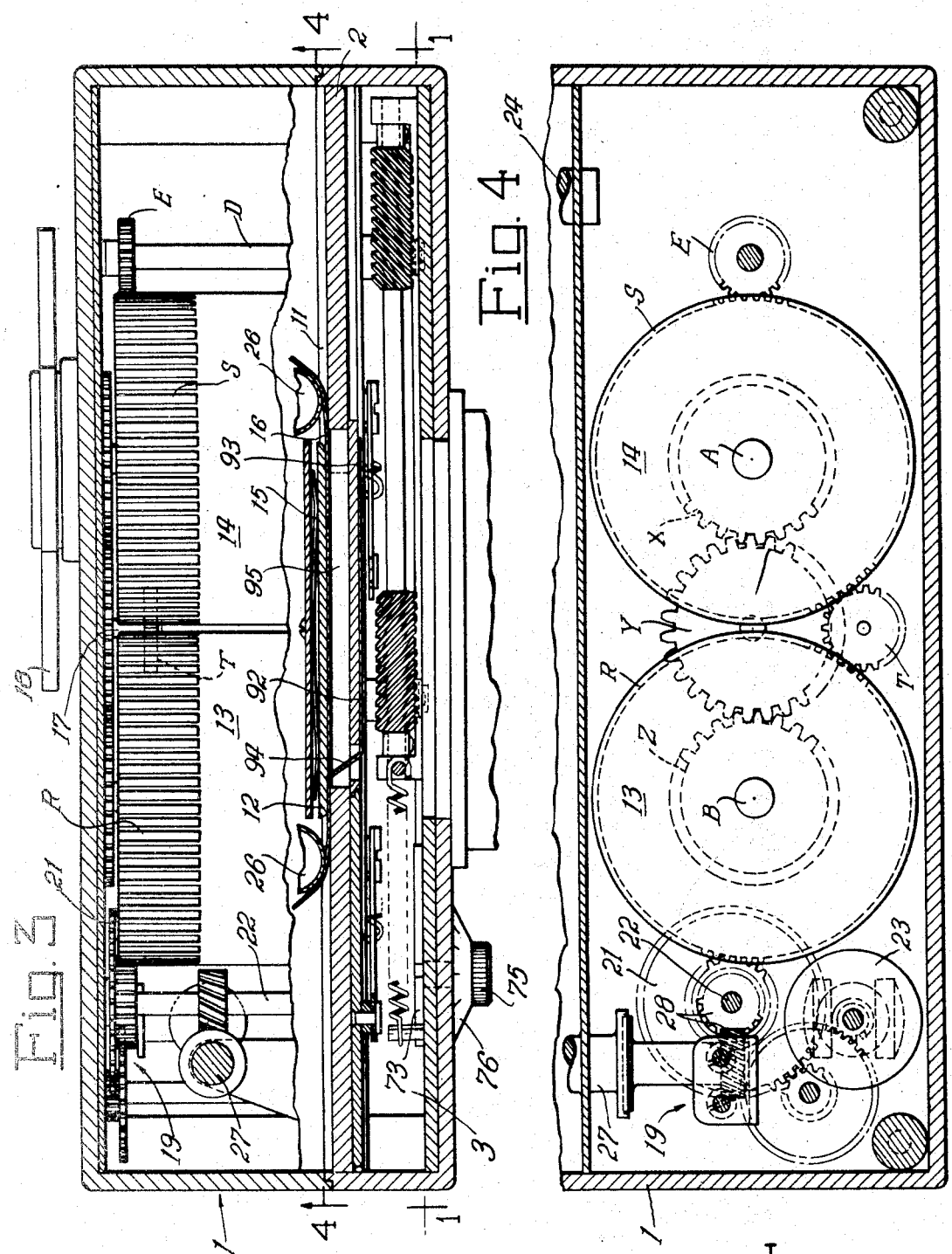

May 19, 1942.　　　G. A. BRUESKE　　　2,283,533
LIGHT SHUTTER
Filed July 26, 1940　　　4 Sheets-Sheet 3

INVENTOR
GEORGE A. BRUESKE
BY Robert F. Miehle, Jr.
ATTY.

INVENTOR
GEORGE A. BRUESKE
BY Robert F. Miehle
ATTY.

Patented May 19, 1942

2,283,533

UNITED STATES PATENT OFFICE 2,283,533

LIGHT SHUTTER

George A. Brueske, Chicago, Ill., assignor to The Bell & Howell Company, Chicago, Ill., a corporation of Illinois Application July 26, 1940, Serial No. 347,675

7 Claims. (Cl. 95—55)

This invention has to do with light exposure shutters of photographic cameras and its general object contemplates the provision of a novel, effective and reliable light shutter which provides for variation of the exposure thereof and which is particularly adapted for photographic cameras of the "miniature" type, the invention contemplating uniform adjusted exposure throughout the exposure area afforded by the shutter.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a vertical sectional view taken rearwardly through a photographic camera embodying my invention and upon a plane substantially coinciding with the back face of the front wall of such camera as indicated by the line 1—1 in Figure 3;

Figure 2 is a transverse vertical sectional view substantially on the line 2—2 of Figure 1;

Figure 3 is a horizontal sectional view substantially on the line 3—3 of Figure 1;

Figure 4 is a fragmentary sectional view illustrating a spring motor and drive gearing for the camera and taken substantially on the line 4—4 of Figure 3;

Figure 5:
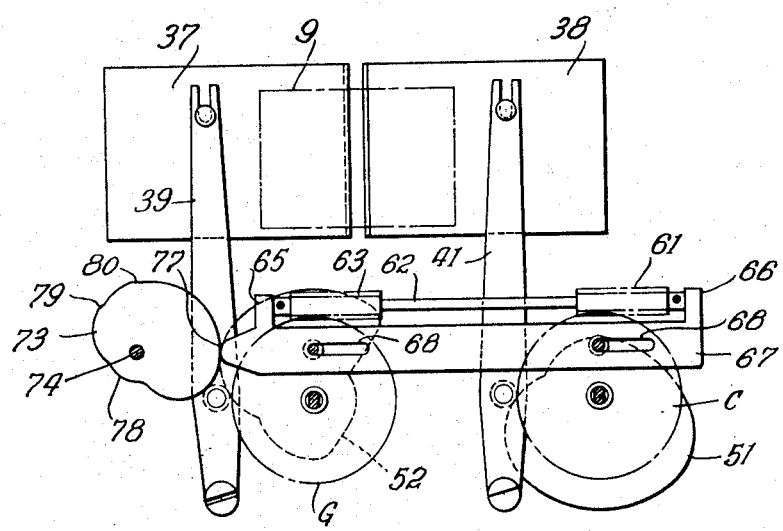
Figure 5 is a view taken similarly to Figure 1, but partially diagrammatical and showing the parts in different positions than those in which they are shown in Figure 1.
Figure 6:
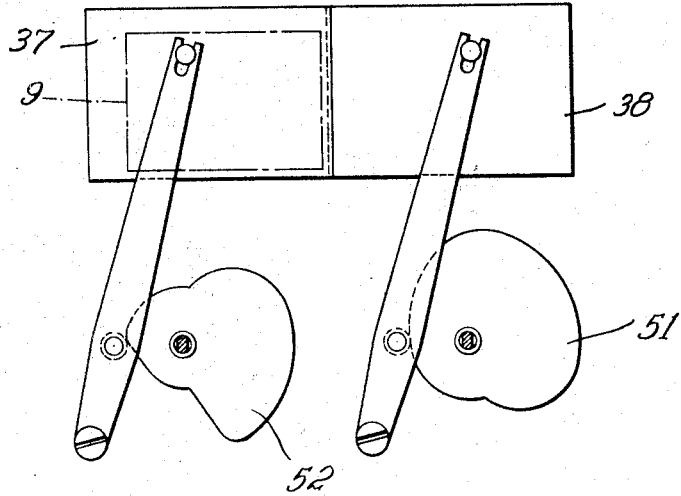
Figure 7:
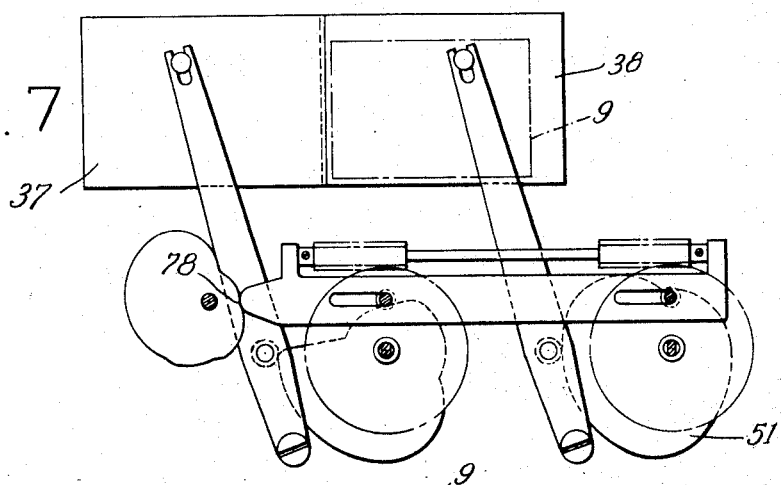
Figure 8:
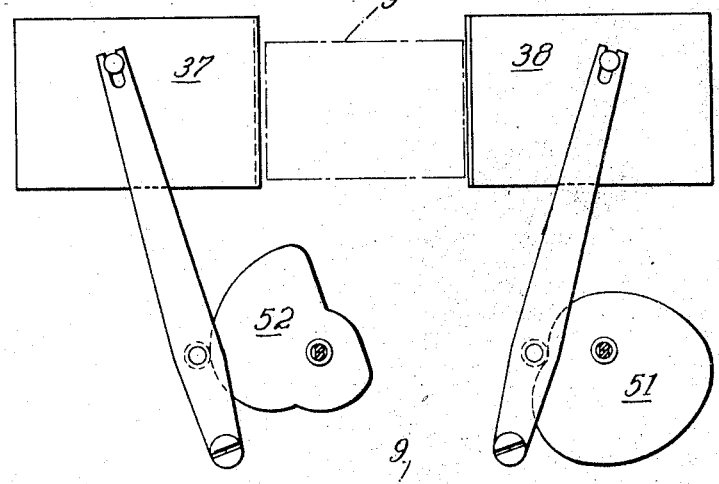
Figure 9:
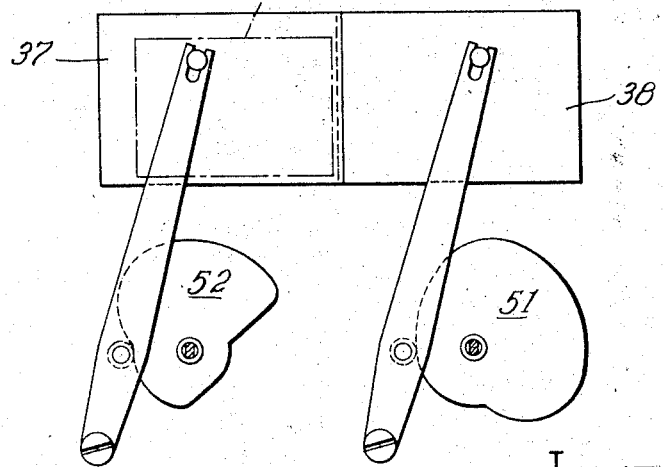

Figure 6 is a view similar to Figure 5, showing the parts in still different positions which are more advanced in the exposure operating cycle; and Figures 7, 8 and 9 are diagrammatic views in elevation similar to Figure 5, showing the parts adjusted for a comparatively fast shutter exposure speed and in successive operating stages of which the advancement corresponds to the order of the figure numbers.

Referring to the drawings, a camera casing is generally designated at 1 in Figures 1, 2, 3 and 4 and is provided with an intermediate transverse vertical partition 2 forming a forward chamber portion 3 and a rearward chamber portion which is divided horizontally by a transverse partition 4 to form an upper chamber 5 and a lower chamber 6, the upper rear portion of the casing being formed by a separate casing portion 7 releasably secured to the main portion of the casing in any suitable manner not shown. Mounted on the forward wall of the casing is a customary photographic lens 8 disposed on a horizontal and rearwardly extending axis traversing the chambers 3 and 5.

The partition 2 is provided with an exposure aperture 9 coinciding with the principal axis of the lens 8, and the rear face of this partition is provided with a rearwardly facing transverse film guide section 11 extending across this exposure aperture and cooperating with a rear film face guide member 12 mounted for movement forwardly and rearwardly and yieldably urged forwardly by one or more leaf springs 15, to provide a transverse film guide for positioning a sensitized film 16 at the exposure aperture 9, the film being transversely movable in the guide for exposing successive portions thereof.

Disposed in the rear portion of the casing below the partition 4 on a forwardly extending horizontal axis, is a usual spring motor, generally designated at 17 and including a pair of rotatable spring chambers 13 and 14.

This motor is wound by an exterior handle 18 at the rear of the casing which is connected with a shaft A and with a shaft B through gears X, Y, and Z whereby the shafts A and B receive simultaneous rotative winding movement. The spring chambers 13 and 14 are caused to unwind when the motor is in operation and are provided with gear teeth R and S which mesh with the teeth of an idler gear T for causing these drums to unwind in unison. Said motor 17, through the gear teeth R, drives a multiplier spur gear train generally designated at 19 and which includes an intermediate gear 21 secured on a rotatable forwardly extending horizontal shaft 22. A centrifugal speed governor of usual construction and generally designated at 23, is driven from this gear train for controlling the speed of said gear train and the mechanism driven thereby.

Two transversely spaced vertically disposed rotatable spools of which one is shown at 25 in Figure 2 are disposed in the rear portion of the casing above the partition 4 and beyond respective ends of the film guide member 12, Figure 3, and the film 16 is fed from the spool not shown but mounted upon a spindle 24, Figure 4, through the film guide channel 11 and is wound on the spool 25 for exposing successive portions of the film. Film engaged revolvable rollers 26 are provided adjacently to the ends of the film guide member 12 for guiding the film from the said spool not shown upon the spindle 24 and to the film take up spool 25. A revolvable vertical shaft 27, Figures 2, 3 and 4, coaxial with the take up spool 25 and having a usual yieldable frictional drive connection therewith and accordingly not shown is connected with the gear train 19 by right angle spiral gearing 28 for yieldably driving the take up spool with actuation of the gear train 19 by the motor 17. An additional gear train driven by the motor 17 includes a gear E, Figure 3, which meshes with the teeth S of the spring chamber 14 and which drives a shaft D, which shaft is disposed forwardly in the horizontal position and journalled in the rear wall of the casing 1 and in the partition 2. Releasable stop mechanism controlling actuation of the spring motor 17 and of the shutter mechanism consists of a bell crank lever 29, Figure 1, pivoted at 31 and having one arm projecting through a slot 32 in the lower wall of the casing for finger actuation of said lever, a spring 33 urging the lever into stopping position with said arm against a stationary stud 34. The lever is likewise urged to releasably place its other arm against a stop stud 35 mounted on a worm or spiral gear C which is non-rotatably secured to the aforesaid shaft D to stop rotation of the spring chambers 13 and 14 and hence of the gear train 19 and the mechanism actuated thereby.

Parallel shouldered guides 36 are secured in a horizontal position on the upper portion of the front face of the partition 2 above and below the exposure aperture 9 and form a transversely extending slide guide. Two light shutter members 37 and 38 are slidably mounted in this slide guide for independent reciprocating movement transversely across the aperture 9 for exposing the portion of the film 16 thereat as hereinafter described.

Two transversely spaced generally vertical arms 39 and 41 are disposed in the forward chamber 3 and have their lower portions pivoted on the partition 2 on transversely spaced forwardly extending pins 42. See Figures 1 and 2. The upper ends of the arms 39 and 41 are operably connected respectively with the shutter members 37 and 38 for independently reciprocating these shutter members by means of studs 43 thereon, said studs being slidably and pivotally disposed in longitudinal notches 44 of said arms.

A radial cam 51, Figure 1 and Figures 5 to 9 inclusive, is secured on the shaft D for rotation therewith immediately in front of the partition 2, and a second radial cam 52 is fixed in parallel axial relation with the cam 51 upon a rotatable shaft F which has its end sections respectively journalled in the partition 2 and in the front wall of the casing as plainly shown in Figure 2. The cam 52 is also immediately in front of said partition 2. The arms 39 and 41 are independently actuated in one direction, with resulting corresponding movement of the shutter members 37 and 38, by transversely disposed tension springs 53 secured with the intermediate portions of these arms and anchored on the partition 2.

A cam roller 54 is mounted on the arm 39 a short distance above the pivotal axis of this arm and is engaged by the cam 52 for actuation of this arm in opposition to the spring 53 for this arm, and a cam roller 55 is mounted on the arm 41 a short distance from the pivotal axis of this arm and is engaged by the cam 51 for actuation of this arm in opposition to the spring 53 for this arm. Thus rotation of the cams 51 and 52 is effected to independently and respectively oscillate the arms 41 and 39 and with them to independently and respectively reciprocate the shutter members 38 and 37.

The opposing vertical edges 56 of the shutter members 37 and 38 are adapted to abut as illustrated in Figure 1 and are shouldered as there shown for excluding the passage of light therebetween when in such abutting relation. When the shutter members are separated in their relative reciprocal movement, see Figure 5, the edges 56 form an exposure opening for exposing the portion of the film at the exposure aperture 9 which exposure opening is obviously variable by relative movement of the shutter members in their reciprocal movement.

The cams 51 and 52 are driven together in adjustable timed relation in the following manner. See Figures 1 to 4 inclusive.

The worm or helical gear C which is fixed to the shaft D for rotation with the cam 51 meshes with a helical or worm gear 61 which is fixed upon an axially adjustable shaft 62 disposed transversely of the axes of the cams 51 and 52. Likewise, a helical or worm gear G which is fixed to the shaft F for rotation with the cam 52 meshes with a helical or worm gear 63 which is also fixed to the shaft 62. The angle of the helical teeth on the gears C and 61 is such that power transmission may be effected from either gear to the other by rotation of either gear, and this is also true with respect to the gears G and 63. Thus when the gear C is rotated for causing rotation of the cam 51, the gear 61 will be caused to rotate as well as the shaft 62 and the gear 63 whereby the gear G, the shaft F and the cam 52 are rotated. Inasmuch as the gears C and G are of the same diameter and have the same number of teeth and inasmuch as the gears 61 and 63 are also of the same diameter and have the same number of teeth, such rotation of the shaft D will result in the cams 51 and 52 being rotated at the same speed. While the shaft D, in the present structure and which is driven from the spring motor 17 through the gear E shown in Fig. 3, constitutes the driving force transmitter for the shutter actuating gearing and the cams 51 and 52, it will be understood that since the gears C, 61, 63 and G effect a driving connection between the cams 51 and 52 the driving force from the spring motor 17 could be applied, for example, directly to the shaft F or to the shaft 62.

Although the ratio of the gearing interconnecting the cams 51 and 52 is such as to cause these cams to rotate at the same speed, the gears C and 61 have such a helical arrangement of their teeth that counter-clockwise rotation of the gear C, as viewed in Figure 1, causes rotation of the shaft 62 in the direction of the arrow 64, whereas the helical arrangement of the teeth upon the gears 63 and G is such as to cause concurrent clockwise rotation of the gear G. Consequently the gears C and 61 may be referred to as right-hand gears and the gears G and 63 as left-hand gears. This opposite helical arrangement of the teeth upon the gears 61 and 63 is clearly shown in Figure 1 from which it can be determined that this use of the right-hand gears C and 61 and the left-hand gears G and 63 will result in rotation of the cams 51 and 52 in opposite directions when the shaft 62 is rotated.

The shaft 62 is rotatively carried in bearing members 65 and 66 at opposite ends of a bar 67 which has elongated bearing slots 68, see Figures 2 and 5, for receiving pins 69 which are anchored in the front wall of the casing 1 and provide a mounting which permits of axial adjustment of said bar 67 and hence of the shaft 62 carried thereby. Said bar 67 carries upon its right end an apertured ear 70 to which is attached one end of a contraction spring 71, the opposite end of this spring being attached to a pin 72 which is suitably anchored in the front wall of the casing. Thus the bar 67 is constantly urged endwise to the left against the profile of a radial cam 73 which is shown in Figures 3 and 5 and which is mounted non-rotatively upon a rotatable shaft 74. Said shaft 74 extends through the front wall of the casing 1 where it has non-rotatively attached thereto a manual operating knob 75 provided with an integral indicating dial 76. This knob 75 and the cam 73 are for controlling the relative angular relation of the shutter actuating members or cams 51 and 52 and hence the opening period of the shutter opening 9 in the manner now to be described.

While rotation of the shaft 62 is accompanied by opposite rotation of the cams 51 and 52 whereby each is advanced in timed relation with the other, endwise adjustment of the shaft 62 and of the gears 61 and 63 will cause the gears C and G to rotate in the same direction as well as the cams 51 and 52 so that, in effect, one of the cams will be advanced whereas the other will be given retrograde rotation wherefore the phase relation or timing of these cams and of the shutter members 37 and 38 actuated thereby will be changed. Such timing is selectively determined by rotating the manipulating knob 75 and hence the cam 73 for placing different radius profiles of this cam in engagement with the left end of the reciprocal bar 67, the spring 71 maintaining such end of the bar in firm engagement with the cam profile.

Observing that the gear C, being fixed on the shaft D and thus fixed with the cam 51, rotates in one to one relation with the cams 51 and 52, the stop stud 35 on the gear C, as releasably engaged by the stop lever 29, stops the light shutter mechanism involving the shutter members 37 and 38 at a fixed point in the operating cycle thereof and at which point in the operating cycle the shutter members 37 and 38 are positioned at their extreme left or starting positions under the independent control of their respective actuating members or cams 52 and 51, as illustrated in Figure 1. In the exposure cycle which starts from this extreme left position, the shutter member 38, actuated by the cam 51, moves to the right in advance of the shutter member 37 for separation therefrom to form an exposure opening between the opposing edges 56 of the shutter members, after the formation of which exposure opening the shutter member 37 actuated by the cam 52, driven in its adjusted timed relation with the cam 51, moves to the right in the following relation with the shutter member 38 to effect uniform exposure of the portion of the film 16 at the exposure aperture 9. Figures 5 and 8 illustrate the exposure period in different adjustments or phase relations of the cams 51 and 52 and consequently different separations of the shutter members resulting in exposures of different length.

When both of the shutter members arrive at their extreme positions to the right they again attain abutting or light interrupting relation after which they are moved to the left in this relation to their extreme left or starting positions in which the mechanism is stopped by engagement of the stop lever 29 with the stop stud 35 preparatory to another exposure cycle.

Figures 1, 5 and 6 illustrate the adjustment of the cams 51 and 52 for a relatively small exposure opening as shown in Figure 5, and Figures 7, 8 and 9 illustrate the adjustment of the cams 51 and 52 for a relatively large exposure opening as shown in Figure 8. Therefore in Figure 5 the shutter speed control cam has a long radius dwell 77 in registry with the left end of the bar 67 for holding it and gears 61 and 63 at the rightmost limit of reciprocal movement wherefore the cam 52 is relatively advanced in its phase relation with the cam 51, and in Figure 7 a dwell 78 of short radius on the cam 73 is in registry with the left end of the bar 67 to permit the spring 71 to shift the shaft 62 and the gears 61 and 63 to the left wherefore the cam 52 is set relatively backwardly in its operating phase relation with the cam 51. Intermediate shutter speeds may be obtained by rotating the knob 75 for placing dwells as 79 or 80 of the cam 73 in registry with the bar 67.

The cams 51 and 52 have corresponding portions as follows: The cam 51 has a dwell portion 82 corresponding with the extreme left or starting position of the shutter member 38, then an active portion 83 effecting right or exposure movement of the shutter member 38, then a dwell portion 84 corresponding with the extreme right position of this shutter member, and then an active portion 85 effecting left for return movement of this shutter member to its extreme left or starting position. The cam 52 has a dwell portion 86 corresponding with the extreme left or starting position of the shutter member 37 and with the portion 82 of the cam 51, then an active portion 87 effecting right or exposure movement of the shutter member 37 and corresponding with the portion 83 of the cam 51, then a dwell portion 88 corresponding with the extreme right position of this shutter member and with the portion 84 of the cam 51, and then a portion 89 corresponding with the return movement portion 85 of the cam 51, this portion 89 being relieved so that the shutter member 38 abuts the shutter member 37 in light interrupting relation and actuates it in its left or return movement independently of the cam 52 to assure light interruption during the left or return movement of the shutter members in the various adjustments of the cam members.

The corresponding active right or exposure movement portions 83 and 87 of the cams 51 and 52 are so formed that they impart uniform and equal velocities to the shutter members 37 and 38 in their right or exposure movement for uniform exposure of the instant portion of the film 16 at the exposure aperture 9, and by relative adjustment of the cams 51 and 52 as hereinbefore described these exposure cam portions are angularly displaced, which results in corresponding variation of the exposure opening formed by the shutter members by reason of the shutter member 38 initiating its right or exposure movement in adjusted priority to the member 37 initiating its corresponding right or exposure movement. The extreme open exposure adjustment of the cams 51 and 52 is illustrated in Figures 7, 8 and 9, in which, as shown in Figure 8, the shutter member 38 is positioned at the end of its right or exposure movement, the shutter member 38 remaining at the end of its exposure movement until the shutter member 37 has completed its right or exposure movement.

As shown and as an incident of the operation cycle of the shutter members 37 and 38, the film 16 is automatically advanced through the exposure guide for exposure of successive portions of the film at the exposure aperture 9. The film 16 is provided with feed perforations 91, see Figure 2, such as are usual in motion picture film. A feed shuttle 92, see Figures 1 and 3, of spring material is secured at one end, as designated at 93, on the upper outer end portion of the shutter member 38, and extends from its mounting on this shutter member longitudinally of the path of the shutter members. The other or free end of the shuttle 92 is formed into an angled rearwardly extending ratchet tooth 94 operating in a transversely extending slot 95 through the partition 2 and disposed above the exposure aperture 9 and yieldably urged against the film in the exposure guide.

The frictional drive of the film take up spool 25 is not sufficient to overcome the friction exerted upon the film 16 in the film guide by the springs 15, so that the film normally remains stationary, and also remains stationary during the exposure period in which the shutter members 37 and 38 operate for exposure or to the right as in Figure 5 as the tooth 94 of the shuttle 92 carried by the shutter member 38 ratchets over the feed perforations 91 of the film. However, on the left or non-exposure movement of the shutter members, the ratchet tooth 94 engages in a feed perforation 91 of the film and moves the same to the left through the exposure guide preparatory to exposing a succeeding portion of the film, the frictionally driven film take up spool 25 taking up the film as thus fed.

While I have thus described my invention, I do not wish to be limited to the precise details described as changes may be readily made without departing from the spirit of my invention, but having thus described my invention I claim as new and desire to secure by Letters Patent the following:

1. In a light shutter, the combination with two exposure opening forming shutter members movable for exposure and relatively movable correspondingly for varying the timing thereof and consequently the exposure opening formed thereby, of means for actuating said shutter members in correspondence for exposure comprising two actuating members respectively operably connected with said shutter members and independently rotatable for imparting the aforesaid movement to said shutter members, a rotatable helical transmission member rotatably connected with one of said actuating members, a second rotatable transmission member rotatably connected with the other of said actuating members and helically engaged in transmitting relation with said helical transmission member to constitute a transmission train between said actuating members, and means for relatively adjusting said transmission members axially of said helical transmission member to adjust the timing of said actuating members.

2. In a light shutter, the combination with two exposure opening forming shutter members movable for exposure and relatively movable correspondingly for varying the timing thereof and consequently the exposure opening formed thereby, of means for actuating said shutter members in correspondence for exposure comprising two actuating members respectively operably connected with said shutter members and independently rotatable for imparting the aforesaid movement to said shutter members, a rotatable helical transmission member, a second rotatable transmission member helically engaged in transmitting relation with said helical transmission member, means rotatably connecting respectively said transmission members with said actuating members to constitute a transmission train between said actuating members including additional rotatable transmission members rotatably and axially fixed respectively with one of said actuating members and one of said helically engaged transmission members and slidably engaged axially of said helical transmission member, and means for adjustably positioning axially of said helical transmission member the helically engaged transmission member fixed with one of said additional transmission members.

3. In a light shutter, the combination with two exposure opening forming shutter members movable for exposure and relatively movable correspondingly for varying the exposure opening formed thereby, of means for actuating said shutter members in correspondence for exposure comprising two meshed rotatable helical gears respectively operatively connected with said shutter members, and means for relatively adjusting said gears axially of one thereof to adjust the timing and thereby the exposure opening of said shutter members.

4. In a light shutter, the combination with two exposure opening forming shutter members movable for exposure and relatively movable correspondingly for varying the exposure opening formed thereby, of means for actuating said shutter members in correspondence for exposure comprising rotatable shutter actuating members respectively operably connected with said shutter members, a rotatable and axially movable shaft, meshed left-hand helical gears rotatably connecting said shaft and one of said actuating members of which gears one is rotatably and axially fixed with said shaft for axial movement therewith relative to the gear meshing therewith, meshed right-hand helical gears rotatably connecting said shaft and the other of said actuating members of which latter gears one is rotatably and axially fixed with said shaft for axial movement therewith relative to the gear meshing therewith, and means for adjustably positioning said shaft axially thereof.

5. In a light shutter, the combination with two correspondingly reciprocal exposure forming shutter members relatively movable in their reciprocal movement for varying and closing the exposure opening formed thereby, of means for reciprocating said shutter members in correspondence to provide an exposure opening in but one direction of movement thereof comprising two rotary cam members for respectively actuating said shutter members, a helical transmission member rotatably fixed with one of said cam members, a second transmission member rotatably fixed with the other of said cam members and helically engaged in transmitting relation with said helical transmission member to constitute a transmission train between said cam members, and means for relatively adjusting said transmission members axially of said helical transmission member to adjust the timing of said cam members.

6. In a light shutter, the combination with two correspondingly reciprocal exposure forming shutter members relatively movable in their reciprocal movement for varying and closing the exposure opening formed thereby, of means for reciprocating said shutter members in correspondence to provide an exposure opening in but one direction of movement thereof comprising spring means for independently actuating said shutter members in one direction, two rotary cam members for respectively actuating said shutters in the opposite direction, a rotatable helical transmission member, a second rotatable transmission member helically engaged in transmitting relation with said helical transmission member, means rotatably connecting respectively said transmission members with said cam members to constitute a transmission train between said cam members including additional rotatable transmission members rotatably and axially fixed respectively with one of said cam members and one of said helically engaged transmission members and slidably engaged axially of said helical transmission member, and means for adjustably positioning axially of said helical transmission member the helically engaged transmission member fixed with one of said additional transmission members.

7. In a light shutter, the combination of two correspondingly reciprocal exposure forming shutter members relatively movable in their reciprocal movement for varying and closing the exposure opening formed thereby, of means for reciprocating said shutter members in correspondence to provide an exposure opening in but one direction of movement thereof comprising spring means for independently actuating said shutter members in one direction, two rotary cam members disposed on parallel axes for respectively actuating said shutter members in the opposite direction, a rotatable and axially movable shaft disposed transversely of the axes of said cam members, meshed left-hand helical gears rotatably connecting said shaft and one of said cam members of which gears one is rotatably and axially fixed with said shaft for axial movement therewith relative to the gear meshing therewith, meshed right-hand helical gears rotatably connecting said shaft and the other of said cam members of which latter gears one is rotatably and axially fixed with said shaft for axial movement therewith relative to the gear meshing therewith, and means for adjustably positioning said shaft axially thereof.

GEORGE A. BRUESKE.